Patented May 21, 1946

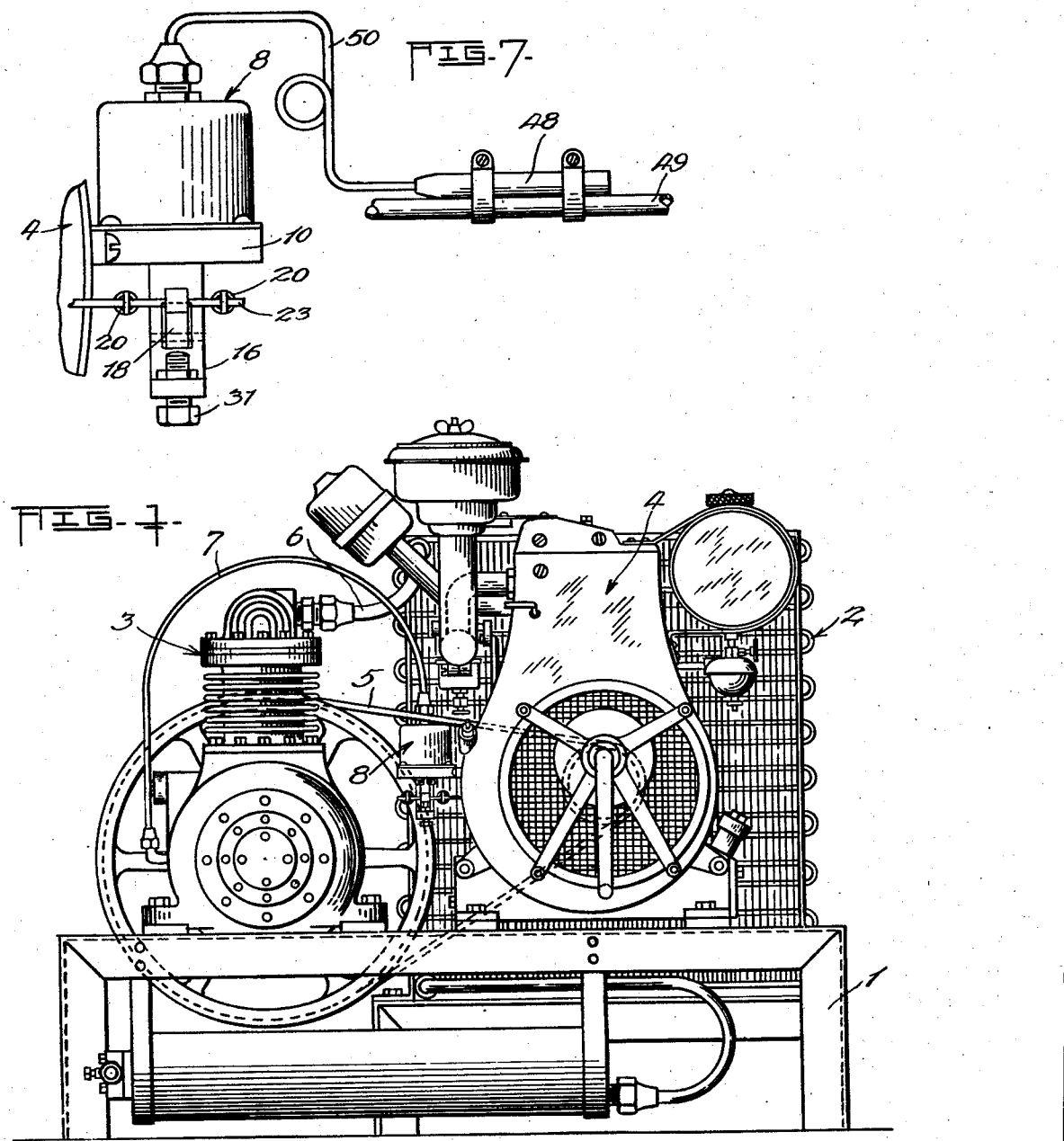

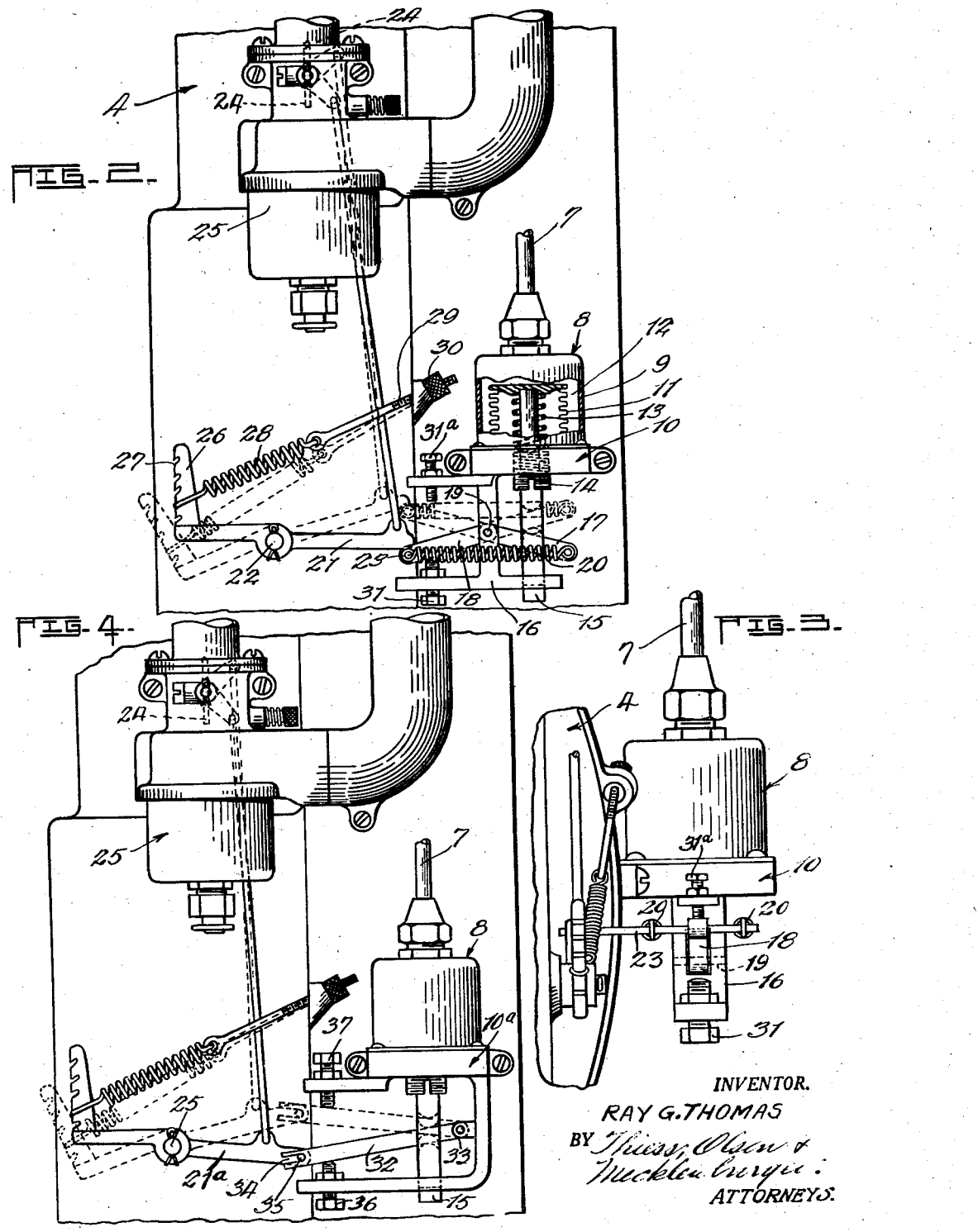

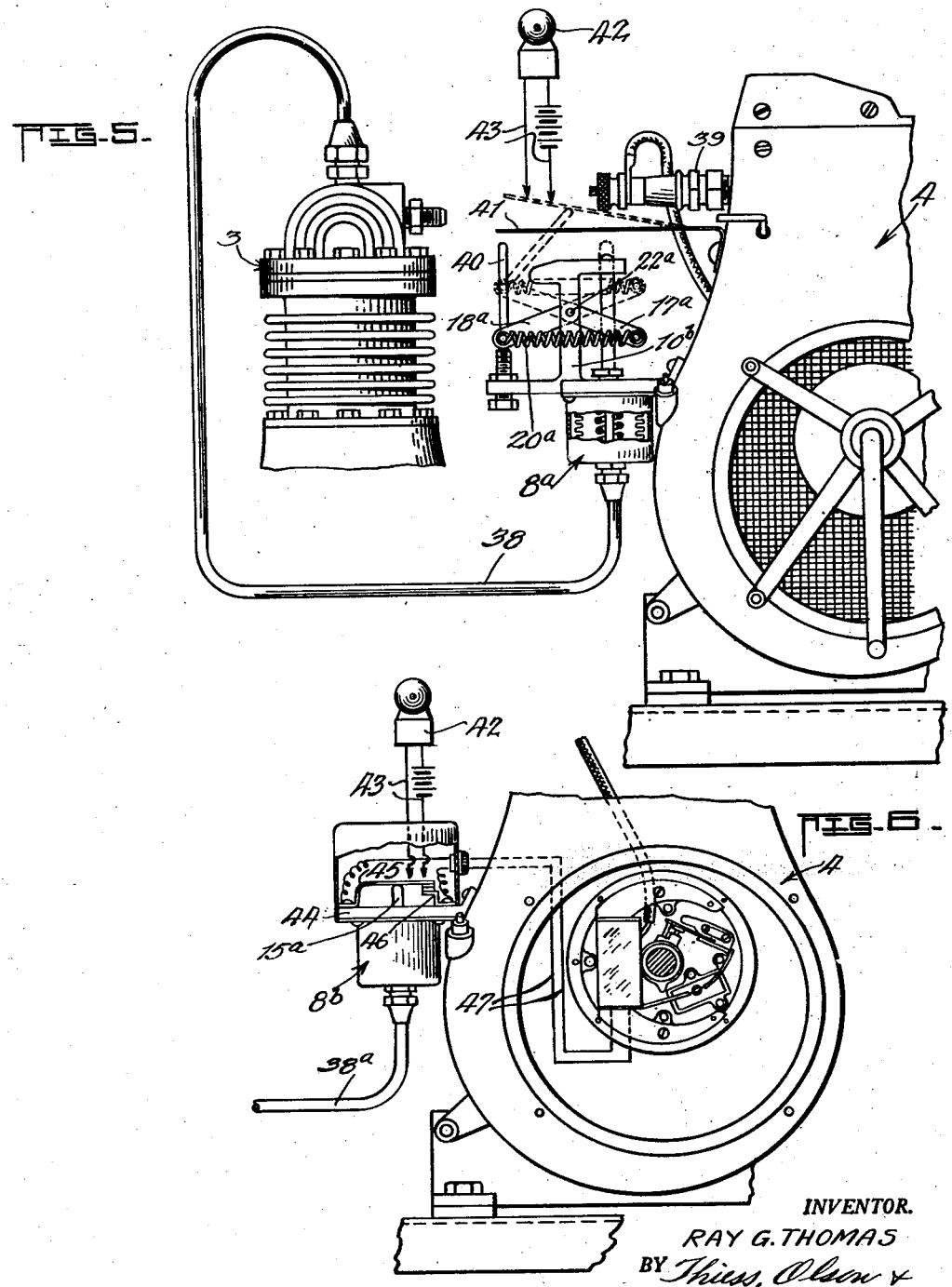

2,400,665

UNITED STATES PATENT OFFICE 2,400,665

CONTROL MECHANISM FOR REFRIGERATING SYSTEMS

Ray G. Thomas, Bloomington, Ill., assignor, by mesne assignments, to Eureka Williams Corporation, a corporation of Michigan Application June 16, 1941, Serial No. 398,198

11 Claims. (Cl. 62—4)

This invention relates to refrigerating systems, with particular reference to refrigerators including a radiator and a compressor forming a part of a refrigerant circulating system. The invention is especially adapted for use in connection with systems provided with a gas engine for operating the compressor.

It is an object of the invention to provide means operable by the pressure or temperature in the circulating system to control the operation of the gas engine. When a predetermined low pressure obtains in the low pressure side of the circulating system, it is desirable to throttle the engine so that it will operate at idling speed. At a predetermined high pressure in the low pressure side, it is desirable that the throttle should be opened so that the engine may operate at a predetermined high speed to reduce the pressure in the low pressure side of the system.

It is therefore an object of the present invention to provide a throttle control for the combustion engine of a refrigerating system wherein the control is operated by fluctuations in the pressure or temperature conditions in the system so that the engine speed may be varied in accordance with refrigerating requirements.

A further object is to provide a throttle control of the character described in which the throttle is automatically operated with a snap action from high speed position to idling speed position, and vice versa, under control of the pressure of the refrigerant in the system.

It is also an object to provide a control of the character described in which the engine speed may be controlled by pressure in the refrigerant system by varying the characteristics of the ignition system of the engine in accordance with fluctuations in the pressure in the refrigerating unit.

Another object is to provide means operable by varying conditions in a refrigerating system, such, for instance, as temperature changes, to control a gas engine in accordance with refrigeration requirements.

Further objects will be apparent from the specification and the appended claims.

In the drawings:

Fig. 1 is a side elevation of one embodiment of the invention and illustrates the control mechanism as applied to a refrigerating system including a compressor and a gas engine for operating the compressor.

Fig. 2 is a side elevation of the throttle control mechanism as applied to the gas engine of the embodiment shown in Fig. 1.

Fig. 3 is an elevation of the embodiment shown in Fig. 2 taken from the left-hand side thereof with the parts in low speed position.

Fig. 4 is a side elevation similar to that shown in Fig. 2, but illustrates an embodiment adapted for gradual control of the throttle from high speed position to idling speed position and vice versa.

Fig. 5 is a somewhat diagrammatic view illustrating an embodiment wherein the pressure operated engine control co-operates with the ignition system to control the gas engine.

Fig. 6 illustrates still another embodiment of the pressure control as applied to the ignition system.

Fig. 7 illustrates another embodiment of this invention wherein the control is effected by a temperature responsive mechanism associated with the cooling coil of the refrigerating system.

The embodiment as illustrated in Fig. 1 comprises a frame 1 on which is supported the usual refrigerant circulating system including a condenser 2, a compressor 3 which may be of the usual piston type, and a gas engine 4, which latter is preferably of the four cycle air-cooled type and is arranged to drive the compressor by means of a belt 5 on suitable pulleys. The high pressure side of the compressor is connected to the system by means of a high pressure conduit 6, and a low pressure conduit 7 connected to the crankcase of the compressor completes the circulation system in the usual manner. In accordance with this invention, controls are provided for operating the gas engine and compressor so that, when the refrigerating coil is at a predetermined low temperature, the gas engine and compressor will operate at idling speed, and, when the pressure or temperature in the refrigeration coil rises to a predetermined degree, the engine and compressor will operate at a predetermined high speed to thereby reduce the pressure in the low pressure side of the refrigerating system.

The present invention provides a control device for the gas engine to accomplish the desired result, and in the embodiments shown in Figs. 1 to 4, inclusive, the device is controlled by variations in the low pressure side of the system. The control may be accomplished either by a snap action of the throttle from idling speed position to high speed position, and vice versa, in accordance with the requirements of the system as illustrated in Fig. 2, or the throttle may move gradually from idling speed position to high speed position, and vice versa, in response to corresponding variations in pressure in the system, as shown in Fig. 4.

It is also contemplated to provide a control from the high pressure side of the compressor which control is adapted to stop the engine completely when the desired refrigerating pressures have been obtained in the system. Furthermore, means is provided so that a suitable signal may be operated whenever the engine is stopped.

In the embodiment shown in Figs. 1 and 2, a pressure operated device 8 is connected to the low pressure side of the compressor 3 by means of the conduit 7. This device is illustrated in detail in Fig. 2 and comprises a casing 9 mounted on a bracket 10 and having a bellows 11 mounted in the casing to provide a pressure chamber 12 connected to the low pressure side of the compressor by means of the conduit 7. A spring 13 is supported on an adjustable bushing 14 and normally tends to retain the bellows in expanded position. The bushing 14 may be adjusted to vary the compression of the spring 13 and thereby adjust the operating characteristics of the bellows so that it and its associated mechanism will respond as desired to predetermined pressures in the crankcase of the compressor.

A stem 15 is secured to the closed end of the bellows 11 and extends through the bushing 14 and is slidably mounted therein. The lower end of the stem 15 is preferably guided in a depending portion 16 of the bracket 10 and is slotted to enable an arm 17 to extend therethrough. The arm 17 and an opposed arm 18 are pivoted on the bracket at 19 and their free ends are connected by means of springs 20, as shown in Fig. 3. The arms 17 and 18 and associated springs 20 form a toggle mechanism which is shown in its normal high speed position. That is, the toggle is in the position which it normally occupies when the throttle is open so that the engine is operating at a predetermined high speed corresponding in response to a predetermined high pressure in the low pressure side of the system.

It will be obvious that, as the pressure is reduced in the conduit 7, which latter is connected to the low pressure side, preferably to the crankcase of the compressor, the spring 13 will expand the bellows 11 accordingly and, when the pressure is reduced a predetermined amount so that the arm 17 and the corresponding ends of the springs 20 pass the pivot point of the arms, the toggle mechanism will snap to the position shown in dotted lines whereupon the engine will operate at idling speed. Also, when the pressure increases in the conduit 7 to a predetermined amount, the toggle mechanism will snap back to its original high pressure or corresponding high speed position, as shown in full lines.

In order to take advantage of this snap action to control the speed of the gas engine, a lever 21 is pivoted at 22 with one end overlapping a pin 23 in the end of the toggle lever 18 as illustrated in Fig. 2. The lever is connected to the usual butterfly throttle valve 24 which is associated with a carburetor 25 on the engine 4. In the embodiment illustrated, the butterfly valve 24 is in a predetermined open position corresponding to a predetermined high speed of the engine, and consequently the engine will operate at this high speed until the butterfly valve 24 is caused by the snap action of the toggle mechanism in response to lowered pressure in the conduit 7 to move to partly closed position to cause the engine to operate at idling speed.

The lever 21 is provided with an outwardly and upwardly extending arm 26 provided with notches 27 adapted to receive the end of a spring 28, the other end of which is adjustably secured to the frame of the engine by means of a threaded bolt 29 and a thumb nut 30. The notches 27 and the adjustable bolt and thumb nut provide means for accurately adjusting the tension of the spring 28, which latter normally tends to open the butterfly valve to high speed position. As soon as the pressure decreases sufficiently in the conduit 7, the toggle mechanism and butterfly valve operating mechanism will be moved by snap action to the dotted line position shown, at which position the engine will operate at idling speed until the pressure again rises to a predetermined degree in the conduit 7.

As shown in Fig. 2, an adjusting screw 31 is provided in the bracket extension for limiting the downward movement of the toggle arm 18 so that a predetermined speed of the engine may be maintained during the high speed portion of the cycle. A similar adjustable stop screw 31a may be provided above the arm 18 in order to accurately predetermine the low speed during the idling portion of the cycle.

Fig. 4 illustrates another embodiment wherein the butterfly valve 24 is gradually moved from high speed position to idling speed, and vice versa, in response to variations in pressure in the conduit 7. In this embodiment, a lever arm 32 extends through a slot in the stem 15 and is pivoted at 33 on the bracket 10a. The opposite end of the lever 32 is slotted at 34 and engages over a pin 35 on the end of the lever 21a. This lever 21a is similar in all respects, except for the pin 35, to the lever 21 previously described. An adjustable stop screw 36, similar to the screw 31 of Fig. 2, is supported on the bracket 10a to limit the position of the lever 32 to a predetermined high speed position, and an adjustable stop screw 37, similar to the screw 31a of Fig. 2, is positioned on the bracket to limit the upper or idling speed position of the lever as shown by dotted lines.

It will be apparent that, when a predetermined high pressure obtains in the conduit 7, the throttle operating mechanism will be in the position illustrated in full lines, whereby the throttle is positioned to operate the engine and associated compressor at a predetermined high speed and, as the pressure gradually reduces in the conduit 7, the throttle control mechanism will gradually move to the dotted line or low speed position, and the gradual movement of the throttle in response thereto will be in accordance with the gradual variation of pressure in the system.

Fig. 5 illustrates another embodiment in which a similar bellows device 8a may be used but is connected to the high pressure side of the compressor by means of a conduit 38. In this embodiment the bellows device is preferably positioned adjacent a spark plug 39 on the engine. A snap action mechanism substantially identical with that previously described is supported on a bracket 10b preferably in the inverted position shown and the toggle arms 17a and 18a are pivoted at 22a and the ends of the arms are connected by means of a spring 20a. The arm 18a is provided with an upwardly extending rod 40 secured thereto and the entire toggle mechanism is movable by the bellows device from the full line position which corresponds to high speed of the compressor to the dotted line position, in which latter position the arm 40 engages a grounded spring 41 and moves the spring into contact with the spark plug 39 as illustrated in dotted lines. In this dotted line position the spark plug is shorted to the engine frame, thereby short-circuiting the ignition system and stopping the engine.

In this embodiment, after the engine stops, the pressure will gradually be reduced in the conduit 38, and, when a predetermined reduced pressure is reached, the toggle mechanism will automatically snap back to the original full line position, thereby breaking the short from the spark plug and enabling the engine to again be started by an operator. In order to signal the operator when the engine is topped, a signal device of any suitable type, such for instance as a bell 42, may be provided in a normally open electric circuit 43. When the spark plug is shorted, the spring contact member 41 will close the circuit 43 as illustrated by dotted lines and will energize the signal.

Fig. 6 illustrates still another embodiment in which a bellows device 8b, which may be similar in all respects to the bellows devices previously described, is supported on a bracket 44. A stem 15a on the bellows device controls a switch comprising a spring terminal 45 resting against the end of the bellows stem and contacting a fixed terminal 46. These terminals 45 and 46 are connected in series in the low tension side of the ignition circuit 47 and, as the bellows device 8b is connected to the high pressure side of the compressor by means of a conduit 38a in the same manner as shown in Fig. 5, the terminals 45 and 46 will be closed until a predetermined high pressure is obtained in the conduit 38a. When the pressure reaches a predetermined amount, the terminals 45 and 46 will open and thereby stop the engine and associated compressor. These terminals will remain open until the pressure in the conduit 38a is again reduced to a predetermined amount, at which time the terminals 45 and 46 will again close, and the engine may then be started to begin a new cycle. A signal may be controlled by the terminal 45 in the same manner as the signal is controlled in the embodiment illustrated in Fig. 5.

Fig. 7 illustrates a slightly different embodiment in which the pressure control device 8 for operating the throttle is controlled by means of a temperature responsive element thermally associated with the cooling coil of the refrigerating system. In this embodiment a temperature responsive element 48 comprising a hollow bulb or the like is secured in heat conducting relationship to a conduit 49 of the refrigerating system. The bulb 48 is preferably secured to the so-called suction line of the cooling coil of the refrigerating system and is charged with any suitable well known gas or liquid which readily expands and contracts in response to temperature changes. The bulb is connected to a bellows within the control device 8 by means of a conduit 50. In this embodiment the control elements are responsive to predetermined temperature changes in the cooling coil to thereby control the throttle of the gas engine in substantially the same manner as the pressure controls previously described. It will be understood, of course, that the temperature responsive embodiment illustrated in Fig. 7 may be applied to the bellows device 8 previously described and illustrated in Figs. 1 to 4 or the bellows devices 8a and 8b previously described and illustrated in Figs. 5 and 6, in which latter the ignition system may be affected to control the gas engine in accordance with refrigerating requirements.

It is intended, of course, that the invention should not be limited to the specific embodiment or embodiments disclosed herein, since modifications may be made, and it is contemplated, therefore, by the appended claims to cover any such modifications as fall within the true spirit and scope of this invention.

Having thus described this invention, what is claimed and desired to be secured by Letters Patent is:

1. In a refrigerator system comprising a compressor, a gas engine for operating said compressor, a throttle for said engine, said throttle being normally spring tensioned toward high speed position, snap-acting means controlled by the pressure in said system to move said throttle from high speed position to low speed position and vice versa in response to predetermined variations in pressure in said system, and means to vary the resistance of said throttle to movement by said pressure controlled means.

2. In a refrigerator system comprising a compressor, a gas engine for operating said compressor, a speed control device for said engine, a spring-tensioned over-center toggle mechanism movable from one position to another to move said speed control device with a snap action from high speed position to low speed position of said engine, and vice versa, a first spring means normally tensioning said speed control device and said toggle mechanism toward said high speed position of said engine, and pressure-controlled means controlled by variations in pressure obtaining in said system and operable against the pressure of said spring-tensioned toggle mechanism to operate said speed control device.

3. A refrigerator comprising the usual refrigerant circulating system including a compressor, a gas engine for continuously operating said compressor, a throttle for controlling the speed of said engine, said system having a high pressure side and a low pressure side, a pressure actuated control mechanim which responds to the pressures obtaining in one of said pressure sides of the system, and a spring-tensioned over-center toggle mechanism disposed between said pressure actuated control mechanism and said throttle for snapping the throttle from high speed position to low speed position, and vice versa, when the pressures in said pressure side of the system reach predetermined limits.

4. In a refrigerator system comprising a compressor, a gas engine for operating said compressor, a speed control device for said engine for controlling its high speed and its low speed, spring means normally tensioning said speed control device toward one of said speed control positions, said spring means being adjustable to vary the tension thereof, a spring-tensioned over-center toggle mechanism movable from one position to another position and in said one position retaining said speed control device in one speed position and in said other position retaining said speed control device in another speed position, and means controlled by variations of pressure in said system to move said toggle mechanism to overcome the resistance thereof by change in pressure in said system so that said toggle mechanism and said speed control device will move to said high speed position and to said low speed position, and vice versa, with a snap action in response to a predetermined high pressure and a predetermined low pressure obtaining in said systems.

5. In a refrigerator system comprising a compressor, a gas engine for operating said compressor, a speed control device for said engine for controlling two of its speeds, means normally biasing said speed control device toward one of said speed control positions, a spring-tensioned over-center toggle mechanism movable from one position to another position and at said one position retaining said speed control device at one of said speed positions and in said other position retaining said speed control device at the other of said speed positions, and means controlled by variations in pressure in said system to move said toggle mechanism to overcome the resistance thereof by change in presure in said system so that said toggle mechanism and said speed control device will move to both of said speed control positions with a snap action in response to predetermined pressures obtaining in said system.

6. In a refrigerator system comprising a compressor, a gas engine for operating said compressor, a throttle for controlling the speed of said engine, said throttle being normally biased toward a position to control one speed of said engine, snap-acting means controlled by the pressure obtaining in said system by reason of the operation of said compressor to move said throttle with a snap action from said first position to a second position to control another speed of said engine, and vice versa, in response to predetermined variations in pressure obtaining in said system, and means to vary the resistance of said throttle to movement by said snap-acting means from the said position toward which said throttle is normally biased.

7. In a refrigerator system comprising a compressor, a gas engine for operating said compressor, a throttle for controlling the speed of said engine, said throttle being normally biased toward a position to control one speed of said engine, and snap-acting means controlled by the pressure obtaining in said system by reason of the operation of said compressor to move said throttle with a snap action from said first position to a second position to control another speed of said engine, and vice versa, in response to predetermined variations in pressure obtaining in said system.

8. In a refrigerator system comprising a compressor, a gas engine for operating said compressor, a throttle for controlling the speed of said engine, said throttle being normally biased toward a position to control one speed of said engine, snap-acting means controlled by the pressures obtaining in said system by reason of the operation of said compressor to move said throttle with a snap action from said first position to a second position to control another speed of said engine, and vice versa, in response to predetermined pressures obtaining in said system.

9. In a refrigerator system comprising a compressor, a prime mover for operating said compressor, a speed control device for said prime mover, said device in open position controlling the high speed of said prime mover and in another position controlling a lower speed of said prime mover, spring means normally tensioning said speed control device toward one of its said speed control positions, an over-center snap-acting toggle mechanism for actuating said speed control device with snap action from one of said speed control positions to the other of said speed control positions, and vice versa, and means controlled by the pressures obtaining in said refrigerator system for actuating said toggle mechanism.

10. In a refrigerator system comprising a compressor, a prime mover for operating said compressor, a speed control device for said prime mover, said device in one position controlling the high speed of said prime mover and in another position controlling a lower speed of said prime mover, means normally biasing said speed control device toward one of its said speed control positions, snap-acting means for actuating said control device with a snap action from one of said speed control positions to the other of said speed control positions, and vice versa, and means controlled by the pressures obtaining in said refrigerator system for actuating said snap-acting means.

11. In a refrigerator system comprising a compressor, a prime mover for operating said compressor, a speed control device for said prime mover, which device in one position controls the high speed of the said prime mover and in another position controls a lower speed thereof, said speed control device being normally biased to one of said speed control positions, snap-acting means controlled by the pressure obtaining in said system to move said speed control device with a snap action from one speed position to the other speed position, and vice versa, in response to predetermined variations in pressure obtaining in said system, and means to vary the resistance of said speed control device to movement in at least one of said speed control positions by said snap-acting means.

RAY G. THOMAS.